(12) United States Patent
Takahashi

(10) Patent No.: US 6,757,810 B1
(45) Date of Patent: Jun. 29, 2004

(54) MICROPROCESSOR INCLUDING MEMORY FOR STORING SET VALUE USED TO SELECT AND EXECUTIVE INSTRUCTION AFTER COMPLETING EXCEPTION HANDLING CAUSED BY EXCEPTION REQUEST

(75) Inventor: Masafumi Takahashi, Kanagawa-ken (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 609 days.

(21) Appl. No.: 09/657,906

(22) Filed: Sep. 8, 2000

(30) Foreign Application Priority Data

Sep. 10, 1999 (JP) ............................................ 11-258009
Sep. 5, 2000 (JP) ....................................... 2000-268939

(51) Int. Cl.[7] .............................. G06F 1/32; G06F 9/48
(52) U.S. Cl. ....................................... 712/200; 712/244
(58) Field of Search ................................. 712/200, 244, 712/233, 232, 230, 248, 220, 41, 42, 43; 713/300, 320, 322, 323

(56) References Cited

U.S. PATENT DOCUMENTS

| | | | | |
|---|---|---|---|---|
| 5,355,503 A | * | 10/1994 | Soffel et al. ................. | 713/322 |
| 5,479,648 A | * | 12/1995 | Barbera et al. .............. | 713/322 |
| 5,502,689 A | * | 3/1996 | Peterson et al. ............. | 368/156 |
| 5,553,236 A | * | 9/1996 | Revilla et al. ................ | 714/25 |
| 5,623,677 A | * | 4/1997 | Townsley et al. ........... | 713/310 |
| 5,632,037 A | * | 5/1997 | Maher et al. ................ | 713/322 |
| 5,652,890 A | * | 7/1997 | Foster et al. ................ | 713/323 |
| 5,726,921 A | * | 3/1998 | Krick .......................... | 713/321 |
| 5,774,702 A | * | 6/1998 | Mitsuishi et al. ........... | 713/501 |
| 5,978,937 A | | 11/1999 | Miyamori et al. | |
| 6,021,501 A | * | 2/2000 | Shay ........................... | 713/322 |
| 6,546,496 B1 | * | 4/2003 | Wang et al. ................ | 713/322 |

\* cited by examiner

Primary Examiner—Henry W. H. Tsai
(74) Attorney, Agent, or Firm—Oblon, Spivak, McClelland, Maier & Neustadt, P.C.

(57) ABSTRACT

A control section sets a value "1" to a first flip-flop when a core executes a halt instruction. An OR circuit halts to output the clock. When the detection section detects an occurrence of the exception request, the control section copies the value "1" of the first flip-flop to a second flip-flop and then sets the value "0" to the first flip-flop to restart the supply of the clock to the core through the circuit. When detecting that the value "1" is set in the second flip-flop, the core judges that the state of the core was in the halt state when the exception request occurred, the core returns to the halt state after the completion of the exception handling by executing the halt instruction. When the second flip-flop does not store the value "1", the core executes an instruction next to the address of the halt instruction.

18 Claims, 9 Drawing Sheets

FIG. 2A  EXAMPLE OF INSTRUCTION SEQUENCE REQUEST
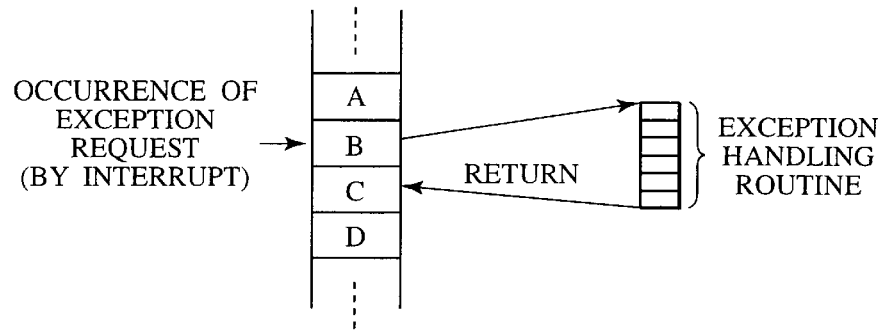
FIG. 2B  EXAMPLE OF INSTRUCTION SEQUENCE REQUEST
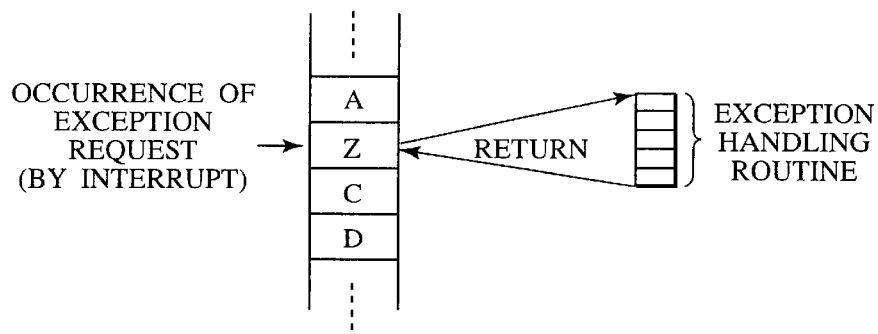
FIG. 2C  EXAMPLE OF INSTRUCTION SEQUENCE REQUEST
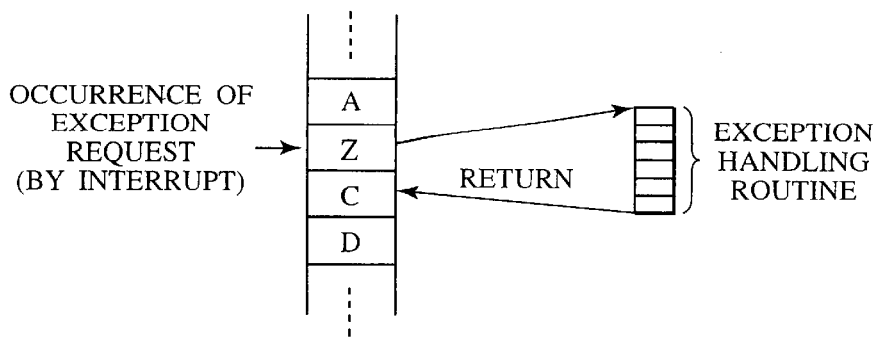

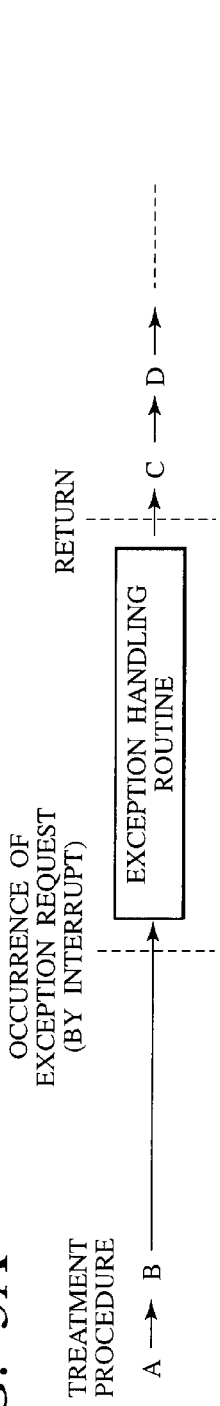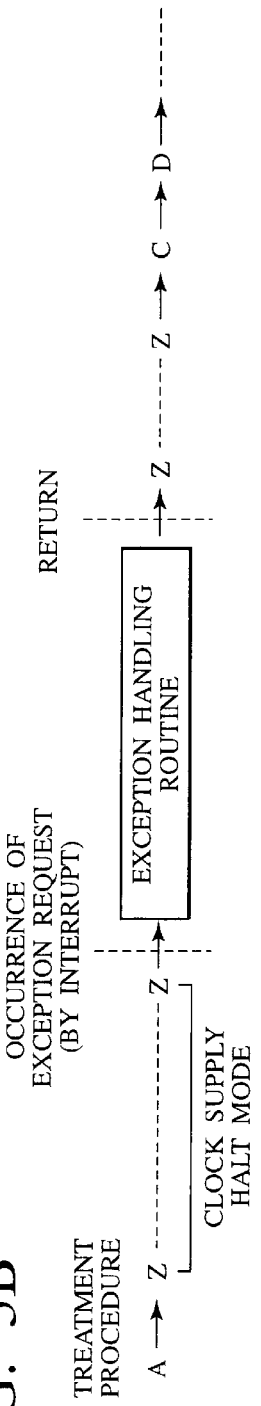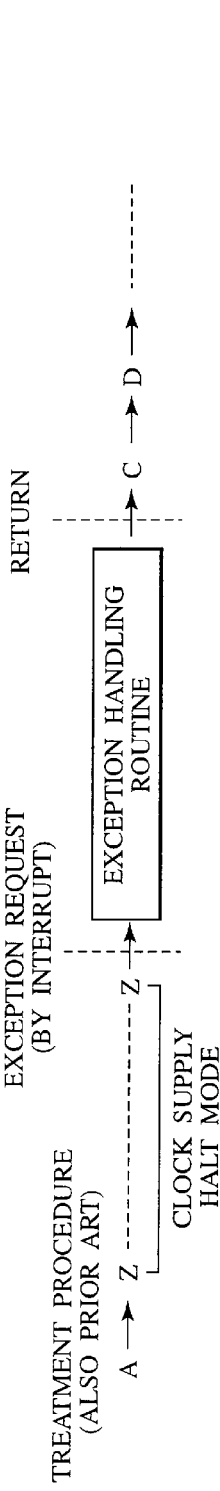

MICROPROCESSOR INCLUDING MEMORY FOR STORING SET VALUE USED TO SELECT AND EXECUTIVE INSTRUCTION AFTER COMPLETING EXCEPTION HANDLING CAUSED BY EXCEPTION REQUEST

CROSS-REFERENCE TO RELATED APPLICATION

This application is based upon and claims the benefit of priority from the prior Japanese Patent Application No. 11-258009, filed Sep. 10, 1999; the entire contents of which are incorporated herein by reference.

BACKGROUND OF THE INVENTION

1. Field of the Invention

The present invention relates to a microprocessor having a function of a clock supply halt mode, and, more particularly, to a microprocessor such as a RISC processor and the like capable of reducing a power consumption.

2. Description of the Related Art

In particularly, a microprocessor such as a RISC processor is widely incorporated in a mobile information station, for example, such as a mobile phone, because the RISC processor is a device of a low power consumption type. Such a microprocessor of a low power consumption type has and also executes an instruction to enter a sleep mode or a standby mode in which the supply of an internal clock to a processor core is temporarily halted in order to reduce the power consumption.

FIG. 7 is a block diagram showing a configuration of a conventional microprocessor having the clock supply halt mode.

In the conventional microprocessor having the configuration shown in FIG. 7, a processor core 1 executes a clock supply halt instruction and provides an instruction to the clock supply halt control section 2 in order to halt the supply of the clock. When receiving the instruction from the processor core 1, the clock supply halt control section 2 sets a value "1" to the flip-flop (F/F) 3. Then, an OR circuit 4 outputs a fixed value "1", and no clock CLK is thereby supplied to the processor core 1. Therefore the processor core 1 enters a clock supply halt mode so that the power consumption of the microprocessor can be reduced.

Next, a description will be given of a case in which an exception request happens while the processor core 1 is executing the clock supply halt instruction Z.

FIG. 8 is a flowchart showing the operation of the processor core in the conventional microprocessor when the exception request happens.

At first, when receiving the exception request from outside, the exception request detection circuit 5 detects this request (Step S801) and then provides an instruction to release the clock supply halt mode to the clock supply halt control section 2. When receiving the instruction from the exception request detection section 5, the clock supply halt control section 2 resets the flip-flop 3, namely, sets the value "0" to the flip-flop 3. Thereby, the clock CLK is supplied to the processor core 1 through the OR circuit 4 because the OR circuit 4 inputs both the output value "1" from the flip-flop 3 and the clock CLK. The processor core 1 or another control circuit (not shown) sets to a program counter (hereinafter referred to as PC) a following address of an instruction whose address is next to the address of the clock supply halt instruction Z which is executed by the processor core 1 when this exception request happens (Step S802).

Because the supply of the clock CLK to the processor core 1 is restarted through the OR circuit 4, the processor core 1 is switched from the clock supply halt mode to a normal operation mode, and the processor core 1 then executes an exception handling routine based on the exception handling instruction (Step S803).

When the execution of the exception handling routine is completed, the processor core 1 returns from the exception handling routine and then executes the following instruction that is next to the clock supply halt instruction Z.

FIGS. 9A and 9B are diagrams showing an instruction sequence and an operation procedure, respectively, to be executed when the exception request shown in the flow chart of FIG. 8 happens. FIG. 9A and FIG. 9B each shows the occurrence of the exception request and the instruction C to be executed by the processor core 1 after the return form the exception handling routine in a time sequence.

As shown in both FIG. 9A and FIG. 9B, the instruction to be executed by the processor core 1 immediately following the completion of the exception handling routine is the instruction C in a case where the exception request happens during the execution of the clock supply halt instruction Z.

In an actual process of the conventional microprocessor having the clock supply halt mode, however, the microprocessor normally enters the standby mode during the clock supply halt mode and then executes the exception handling routine when an event of the exception handling happens by interrupt, and the microprocessor returns to the clock supply halt mode after the completion of the exception handling routine. In this case, it is necessary to execute the clock supply halt instruction Z after the completion of the exception handling routine caused by the interrupt in order to shift the microprocessor having the conventional configuration from the exception handling mode to the clock supply halt mode. Because in the microprocessors having many conventional configurations, the instruction to be executed immediately following the completion of the exception handling routine is the following instruction, namely, the instruction C shown in FIG. 9(a) whose address is next to the address of the instruction that was executed when the exception request happened.

In order to solve this conventional problem, it is possible to have a configuration in which the clock supply halt instruction Z (which was executed when the exception request happens) is forcedly set to be executed after the return from the execution of the exception handling routine only when the interrupt happened during the execution of the clock supply halt instruction Z.

However, there are many kinds of actual interrupts, for example, a timer interrupt, and there is an actual case in which the instruction to be executed immediately following the completion of the exception handling routine for the timer interrupt is an instruction other than the clock supply halt instruction under the condition in which the microprocessor was in the clock halt mode when the timer interrupt happened.

As described above, although the conventional microprocessor having the clock supply halt mode returns only to a fixed mode such as the clock supply halt mode immediately following the completion of the exception handling routine caused by the interrupt happened during the clock supply halt mode, it is difficult to return any desired modes other than the clock supply halt mode. That is, the microprocessor having the conventional configuration described above cannot return to any actual desired modes.

SUMMARY OF THE INVENTION

Accordingly, an object of the present invention is, with due consideration to the drawbacks of the conventional technique, to provide a microprocessor capable of returning to a desired mode based on information regarding which instruction is executed by a processor core when an exception request caused by an interrupt and the like happened under the execution of the clock supply halt instruction, and also capable of reducing a power consumption.

In accordance with a preferred embodiment of the present invention, a microprocessor is capable of handling a function for setting a processor core into a standby state caused by executing a clock supply halt instruction in which a supply of a clock to the processor core for executing various kinds of processes and instructions is temporarily halted. In particularly, the microprocessor comprises a memory circuit for storing a state of the processor core at an occurrence time of an exception request caused by an interrupt. In the above microprocessor, the processor core selects and executes the instruction to be executed according to the value stored in the memory circuit when the state of the processor core returns from an exception handling after a completion of the exception handling caused by the exception request.

In the microprocessor as another preferred embodiment of the present invention, the memory circuit stores the value to be used for judging whether the processor core is in the standby state in which no clock is supplied or in a normal state other than the standby state when the exception request happens.

In the microprocessor as another preferred embodiment of the present invention, the value stored in the memory circuit indicates that the processor core is in the standby state where no clock is supplied when the exception handling happens, the processor core selects the clock supply halt instruction to be executed when the state of the processor core returns from the exception handling after the completion of the exception handling.

In the microprocessor as another preferred embodiment of the present invention, the value stored in the memory circuit indicates that the processor core is in the standby state where no clock is supplied when the exception handling happens, the processor core selects an instruction, whose address is next to the address of the clock supply halt instruction, to be executed when the state of the processor core returns from the exception handling after the completion of the exception handling.

In the microprocessor as another preferred embodiment of the present invention, the value stored in the memory circuit indicates that the processor core is in the normal state other than the standby state where no clock is supplied when the exception handling happens, the processor core selects an instruction, whose address is next to the address of the clock supply halt instruction, to be executed when the state of the processor core returns from the exception handling after the completion of the exception handling.

In the microprocessor as another preferred embodiment of the present invention, the memory circuit is a flip-flop for storing a value indicating whether the clock is supplied to the processor core or not, and the processor core checks the value stored in the flip-flop until the exception handling is completed in order to judge whether the state of the processor core when the exception handling happens is in the standby state where no clock is supplied or in a normal state other than the standby state.

In the microprocessor as another preferred embodiment of the present invention, the processor core changes the instruction to be executed when the state of the processor core returns from the exception handling after the completion of the exception handling.

In accordance with another preferred embodiment of the present invention, a microprocessor is capable of handling a function for setting a processor core into a standby state caused by executing a clock supply halt instruction in which a supply of a clock to the processor core for executing various kinds of processes and instructions is temporarily halted. In particularly, the microprocessor comprises a logical circuit, a first memory circuit, a second memory circuit, and a judgment control section. The logical circuit performs a supply/halt of the clock to the processor core. The first memory circuit stores a set value to be used for controlling the supply of the clock to the processor core through the logical circuit. The second memory circuit stores the set value of the first memory circuit. The judgment control section sets the set value of the first memory circuit to the second memory circuit at an occurrence time of the exception request when the judgment control section detects the occurrence of an exception request, in order to supply the clock through the logical circuit to the processor core, and indicates that the processor core executes the exception handling. In the microprocessor, the processor core sets the instruction to be executed according to the set value of the second memory circuit when the processor core returns from the exception handling after the completion of the exception handling.

In the microprocessor as another preferred embodiment of the present invention, the judgment control section comprises an exception request detection section, and a clock supply halt control section. In the microprocessor, the exception request detection section detects an occurrence of the exception request and outputs a detection result to both the clock supply halt control section and the processor core. The clock supply halt control section sets the set value of the first memory circuit to the second memory circuit according to the detection result from the exception request detection section. The processor core executes the exception handling based on the detection result from the exception request detection circuit, and controls the setting operation to the first memory circuit by the clock supply halt control section based on the set value of the second memory circuit after the completion of the exception handling, and selects and executes the instruction to be executed after the completion of the exception handling.

In the microprocessor as another preferred embodiment of the present invention, each of the first memory circuit and the second memory circuit is a flip-flop.

In the microprocessor as another preferred embodiment of the present invention, the logical circuit is an OR gate which inputs the clock as one input and inputs the set value of the first memory circuit as another input.

In the microprocessor as another preferred embodiment of the present invention, the logical circuit is an AND gate which inputs the clock as one input and inputs the set value of the first memory circuit as another input.

BRIEF DESCRIPTION OF THE DRAWINGS

These and other objects, features, aspects and advantages of the present invention will become more apparent from the following detailed description of the present invention when taken in conjunction with the accompanying drawings, in which:

FIGS. 2A, 2B, and 2C are diagrams, each showing an instruction sequence to be executed by a processor core in the microprocessor shown in FIG. 1 when an exception handling happens;

FIGS. 3A, 3B, and 3C are diagrams, each showing an execution procedure of the processor core in the microprocessor shown in FIG. 1;

DESCRIPTION OF THE PREFERRED EMBODIMENTS

Other features of this invention will become apparent through the following description of preferred embodiments which are given for illustration of the invention and are not intended to be limiting thereof.

First Embodiment

Figure 1:
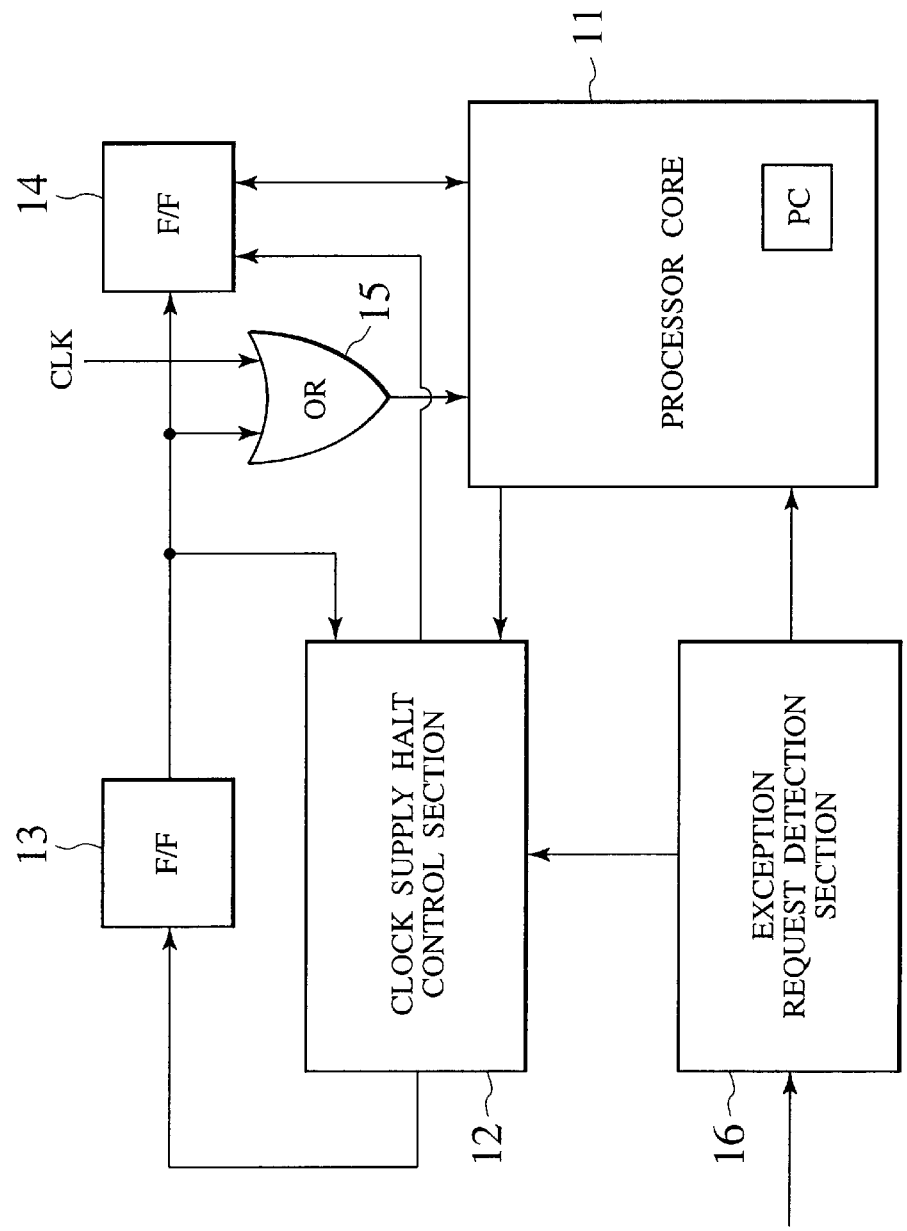
FIG. 1 is a block diagram showing a configuration of a microprocessor according to the first embodiment of the present invention.

FIG. 1 is a block diagram showing a configuration of the microprocessor according to the first embodiment of the present invention. As shown in FIG. 1, the microprocessor comprises a processor core 11 for executing all kinds of instructions and processes, a clock supply halt control section 12 for controlling the supply/halt of the clock CLK to the processor core 11, a flip-flop 13 for storing a value of a clock supply/halt control signal, a flip-flop 14 for storing the same value of the flip-flop 13 under a desired condition, an OR circuit 15 for supplying and halting the clock CLK to the processor core 11 according to the output from the flip-flop 13 set by the clock supply halt control section 12, and an exception request detection section 16 for detecting an occurrence of the exception request by interrupt.

By the way, the flip-flops 13 and 14, the clock supply halt control section 12, the OR circuit 15, and the exception request detection section 16 operate according to another clock (not shown) other than the clock CLK which is gated by the OR circuit 15.

Next, a description will be given of the operation of the microprocessor according to the first embodiment of the present invention.

Figure 4:
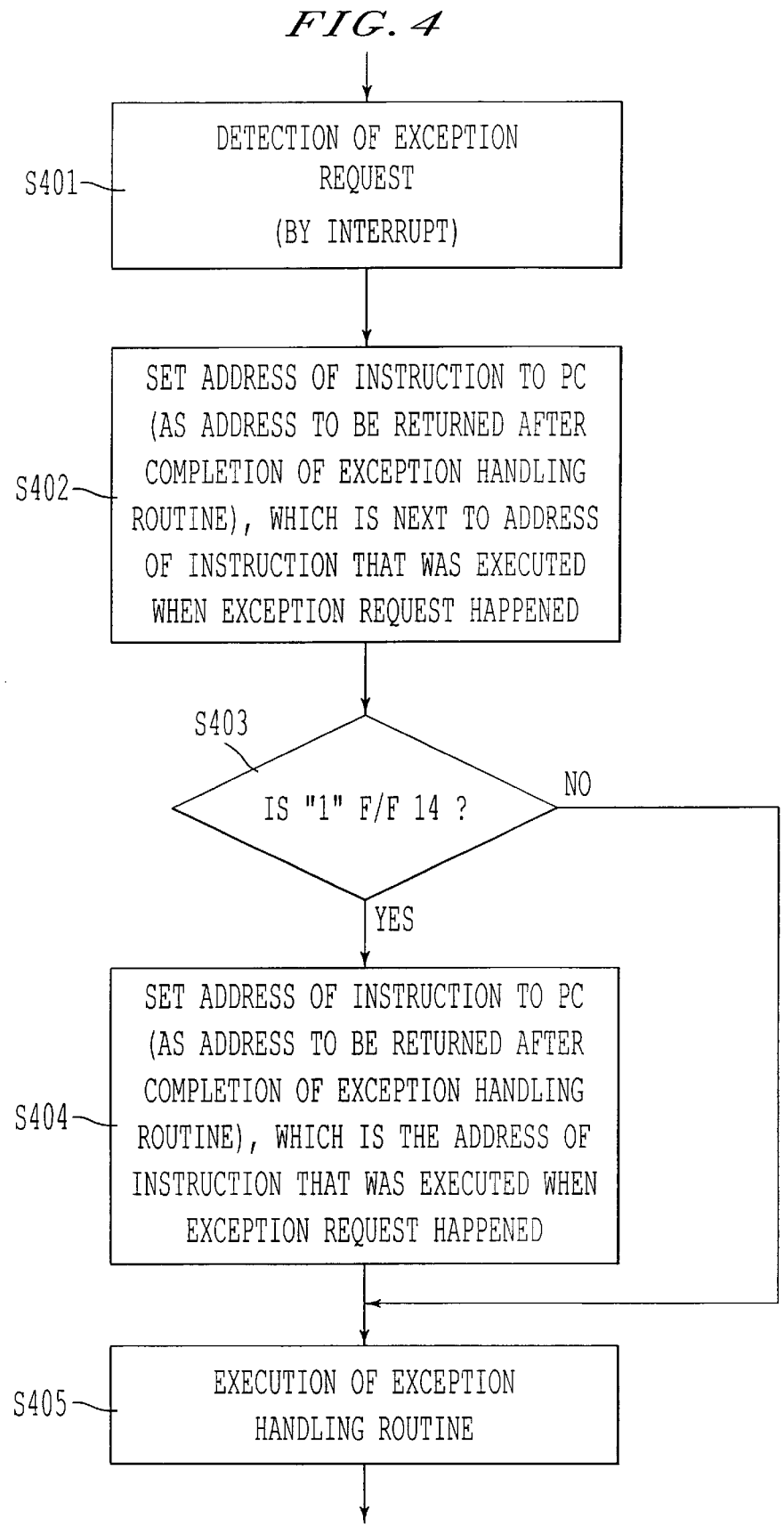
FIG. 4 is a flow chart showing the operation of the processor core in the microprocessor shown in FIG. 1 when the exception handling happens.

FIGS. 2A, 2B, and 2C are diagrams, each showing an instruction sequence to be executed by the processor core 11 in the microprocessor shown in FIG. 1 when an exception handling happens. FIGS. 3A, 3B, and 3C are diagrams, each showing an execution procedure of the processor core 11 in the microprocessor shown in FIG. 1. FIG. 4 is a flow chart showing the operation of the processor core 11 in the microprocessor shown in FIG. 1 when the exception handling happens.

In the following example, it is assumed that both the flip-flops 13 and 14 have been reset and store the value "0" when the processor core 11 executes a normal operation other than the clock supply halt instruction.

Firstly, the processor core 11 executes the instruction A and the instruction B in the instruction sequence shown in FIG. 2A and the exception request happens during the execution of the instruction B. This instruction B is a normal instruction that causes a normal operation other than the clock supply halt instruction Z.

That is, when detecting the occurrence of the exception request while the processor core 11 executes firstly the instruction A and then instruction B, the exception request detection section 16 informs the occurrence of the exception request to the clock supply halt control section 12 and then to the processor core 11.

When receiving the information regarding the occurrence of the exception request from the exception request detection section 16, the clock supply halt control section 12 copies the value stored in the flip-flop 13 to the flip-flop 14 and then resets the flip-flop 13 and sets the value "0" to the flip-flop 13.

Then, the processor core 11 or another control circuit (not shown) sets to a program counter (hereinafter, referred to as PC) an address of the following instruction C as the address to be returned after the completion of an exception handling routine caused by the exception request (Step S402). The instruction C is next in address to the instruction B that was executed when the exception request happened.

In Step S403 in the flow chart shown in FIG. 4, the processor core 11 checks the value stored in the flip-flop 14. When the value stored in the flip-flop 14 is not the value "1" (namely, the value "0"), the operation flow goes to Step S405 in order to execute the exception handling routine. When checking the value stored in the flip-flop 14 at Step S403, the processor core 11 resets the flip-flop 14, namely sets the value "0" to the flip-flop 14 (in this case, the value of the flip-flop 14 is not changed).

The processor core 11 returns from the exception handling routine after the completion of the exception handling routine at Step S405, and then executes the instruction C, whose address has been set into the program counter PC and is next to the address of the instruction B that was executed when the exception request happened.

Next, a description will be given of a case in which the processor core is executing the clock supply halt instruction Z as a standby process that means the clock supply halt mode when the exception request happens.

As shown in FIG. 2B and FIG. 3B, the processor core 11 firstly executes the instruction A and then clock supply halt instruction Z. Thereby, the processor core 11 gives the instruction to the clock supply halt control section1 12 in order to halt the supply of the clock CLK to the processor core 11. The clock supply halt control section1 12 sets the value "1" to the flip-flop 13 so that the OR circuit 15 outputs the fixed data "1" continuously. Accordingly, the supply of the clock CLK to the processor core 11 may be halted.

In this situation, when detecting the occurrence of the exception request (Step S401), the exception request detection section 16 informs the occurrence of the exception request to the clock supply halt control section 12. Thereby, the clock supply halt control section 12 copies the value "1" stored in the flip-flop 13 to the flip-flop 14, and then resets the flip-flop 13, so that the flip-flop 13 stores the value "0".

The processor core 11 or another control circuit (not shown) sets to the PC the address of the following instruction C as the address to be returned after the completion of the exception handling routine caused by the exception request (Step S402). The instruction C is next in address to the clock supply halt instruction Z which was executed when the exception request happened.

Next, at Step S403, the processor core 11 checks the value of the flip-flop 14, and the operation flow goes to Step S404 only when the flip-flop 14 stores the value "1". By the way, when the processor core 11 detects that the flip-flop 14 stores the value "1", the operation flow goes to Step S405 from Step S403.

At Step S404, the processor core 11 or another control circuit subtracts the value of the PC, which indicates the target address to be returned, by one. Then, the operation flow goes to Step S405. By the way, the processor core 11 resets the flip-flop 14 after checking the value of the flip-flop 14. The flip-flop 14 thereby stores the value "0".

As described above, when the value "0" is set to the flip-flop 13, the supply of the clock CLK to the processor core 11 is restarted through the OR circuit 15. The processor core 11 thereby executes the exception handling routine (Step S405).

The processor core 11 returns from the exception handling routine executed at Step S405 after the exception handling routine is completed and initiates to execute the clock supply halt instruction Z again designated by the PC, as shown in FIG. 3B. The processor core 11 indicates it to the clock supply halt control section 12 in order to halt the supply of the clock CLK. Thereby, the clock supply halt control section 12 sets the value "1" to the flip-flop 13, so that the OR circuit 15 outputs the fixed value "1". This means that the supply of the clock CLK to the processor core 11 is halted. The processor core 11 thereby enters the standby state.

Next, a description will be given of the case in which the processor core 11 is executing the clock supply halt instruction Z as the standby process that means the clock supply halt mode when the exception request happened, and the processor core 11 executes the instruction C, which is next in address to the clock supply halt instruction Z, immediately following the completion of the exception handling routine. This case is the same of the conventional case that has been described in the related art section shown in FIG. 7, FIG. 8, and FIG. 9A and FIG. 9B.

The microprocessor of the first embodiment shown in FIG. 1 can execute the same operation of the conventional microprocessor. That is, as shown in FIG. 2C and FIG. 3C, the processor core 11 firstly executes the instruction A and then clock supply halt instruction Z. Thereby, the processor core 11 gives the instruction to the clock supply halt control section1 12 in order to halt the supply of the clock CLK. When receiving this instruction, the clock supply halt control section1 12 sets the value "1" to the flip-flop 13 so that the OR circuit 15 outputs the fixed data "1" continuously. Accordingly, the supply of the clock CLK to the processor core 11 may be halted.

In this situation, when the exception request detection section 16 detects the occurrence of the exception request and the processor core 11 will execute the instruction C that is next in address to the clock supply halt instruction Z after the completion of the exception handling routine caused by the exception request, the exception request detection section 16 controls the operation of the clock supply halt control section 12 so that the value of the flip-flop 13 is not copied to the flip-flop 14 and the value "0" is set to the flip-flop 14. Thereby, because the value of the flip-flop 14 is "0" at the detection process in Step S403 in the flow chart of FIG. 4, the process of Step S404 is not executed, and the instruction to be executed by the processor core 11 after the completion of the exception handling routine becomes the instruction C, as shown in both FIG. 2C and FIG. 3C.

In the execution example of the process shown in FIG. 2C and FIG. 3C, the exception request detection section 16 generates and transfers the instruction to the clock supply halt control section 12 according to the kind of the exception request so that the clock supply halt control section 12 sets the value "0" to the flip-flop 14. However, the present invention is not limited by this manners, for example, it is also possible that several kinds of clock supply halt instructions are prepared, and a desired kind of the clock supply halt instruction is inserted in the instruction sequence to be executed by the processor core 11, and the processor core 11 forcedly sets the flip-flop 14 according to the desired kind of the clock supply halt instruction. It is thereby possible to set the instruction C shown in both FIG. 2C and FIG. 3C as the instruction to be executed by the processor core 11 immediately following the completion of the exception handling routine in the case where the exception request happens while the clock supply halt instruction is executed.

As described above, according to the microprocessor of the first embodiment, the flip-flop 14 is incorporated in order to store the value of the flip-flop 13 (this value indicates the information regarding the supply/halt of the clock CLK to the processor core 11) when the exception request happens. The processor core 11 checks the value of the flip-flop 14 when the execution of the exception handling routine caused by the exception request is completed in order to recognize whether or not the state of the processor core 11 was executing when the exception request happened. When the detection result indicates that the processor core 11 entered the clock supply halt state when the exception request happened, the processor core 11 may enter the clock supply halt state again after the completion of the exception handling routine. When the result of the detection result does not indicate it, the processor core 11 may enter the normal operation state other than the clock supply halt state after the completion of the exception handling routine. In addition, it is possible for the microprocessor of the first embodiment to execute the instruction C shown in FIG. 2C and FIG. 3C (whose address is next to the address of the clock supply halt instruction Z) immediately following the return from the exception handling routine regardless of the execution of the clock supply halt instruction when the exception request happens, like the conventional microprocessor.

Accordingly, it is possible for the microprocessor to return a desired operation mode after the completion of the exception handling routine based on the state that the processor core executed the clock supply halt instruction when the exception request happened. Thereby, the microprocessor of the first embodiment can increase the flexibility of the operation while the power consumption is reduced by the various functions such as the standby mode (or the clock supply halt mode) and the like.

Second Embodiment

Figure 5:
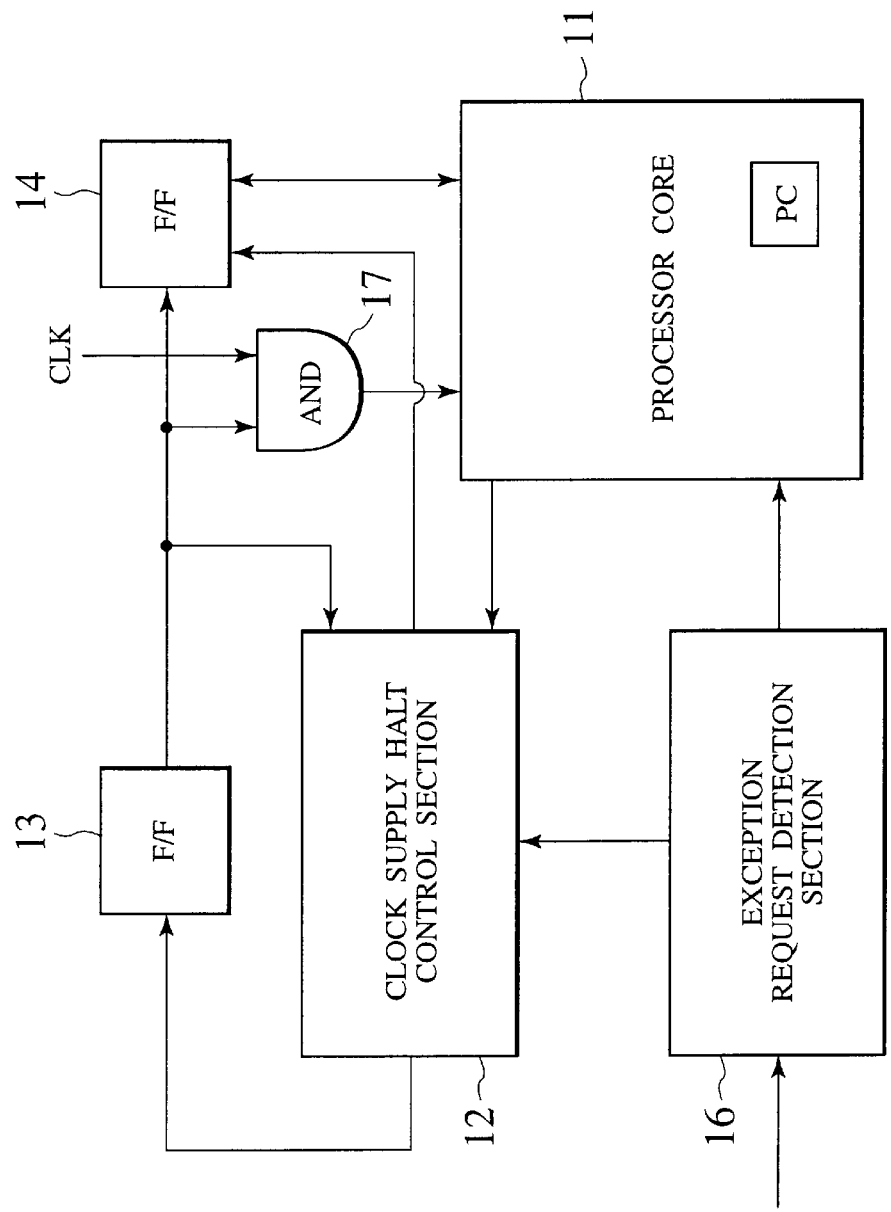
FIG. 5 is a block diagram showing a configuration of a microprocessor according to the second embodiment of the present invention.

FIG. 5 is a block diagram showing a configuration of the microprocessor according to the second embodiment of the present invention. The same components in both the microprocessors of the first and second embodiments are referred to as the same reference numbers and characters, and the explanation of them is omitted here.

In the configuration of the microprocessor of the second embodiment is almost equal to that of the first embodiment. The differences between them are following: An AND circuit 17 is used instead of the OR circuit 15 in the first embodiment; and the value to be stored into both the flip-flops 13 and 14 are different from the manner in the first embodiment.

Next, a description will be given of the operation of the microprocessor of the second embodiment.

Figure 6:
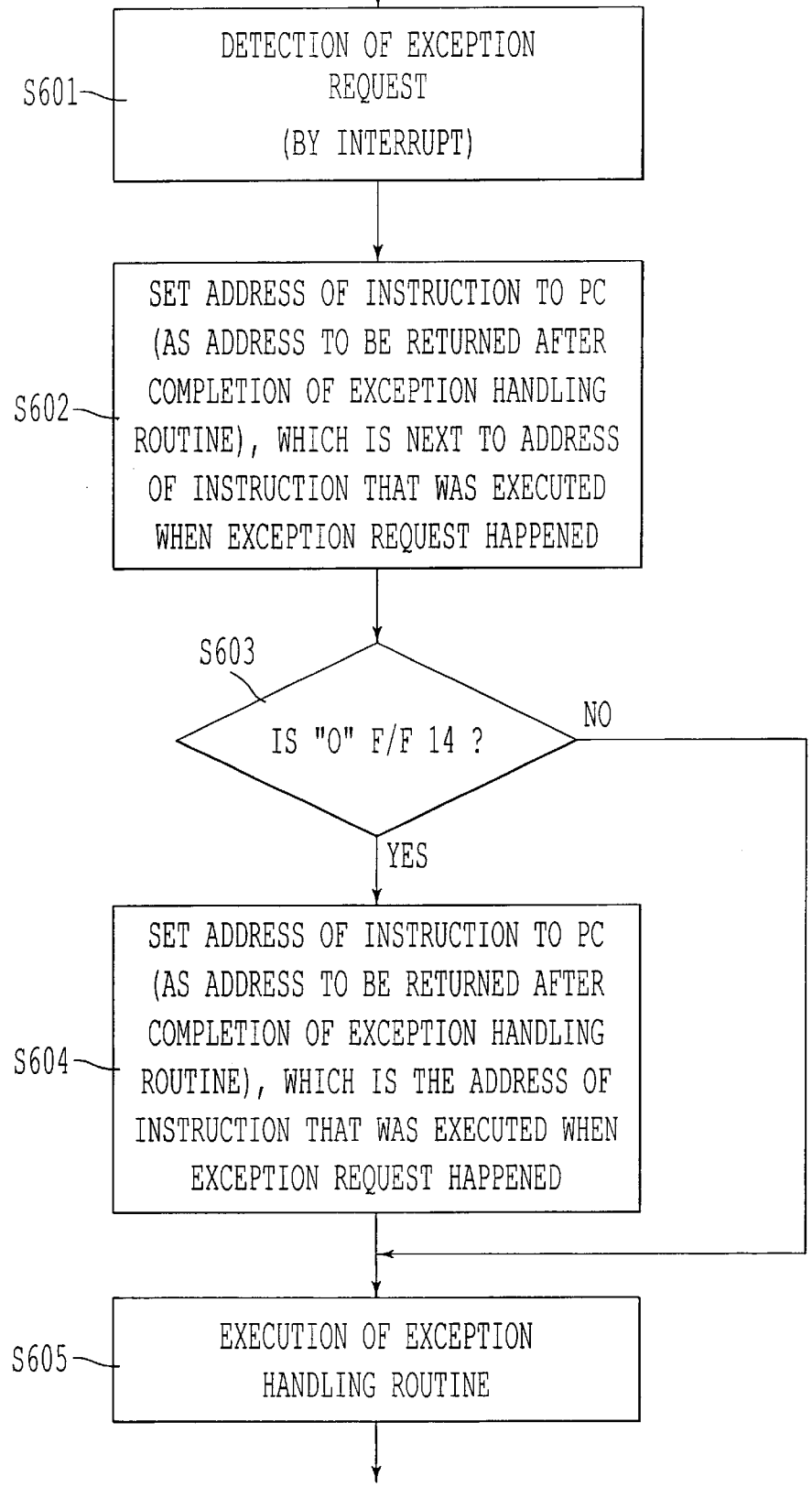
FIG. 6 is a flow chart showing the operation of the processor core in the microprocessor shown in FIG. 5 when the exception handling happens.
Figure 7:
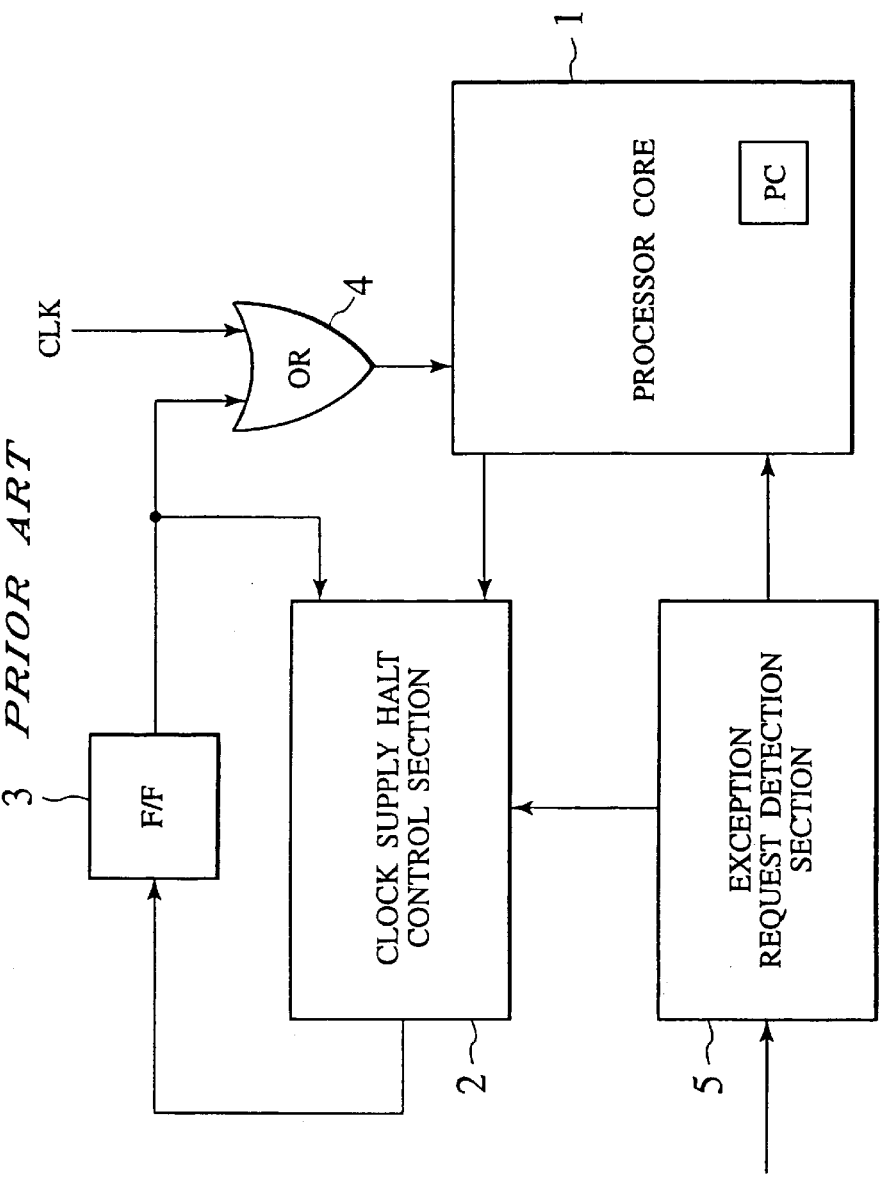
FIG. 7 is a block diagram showing a configuration of a conventional microprocessor having a clock supply halt mode.
Figure 8:
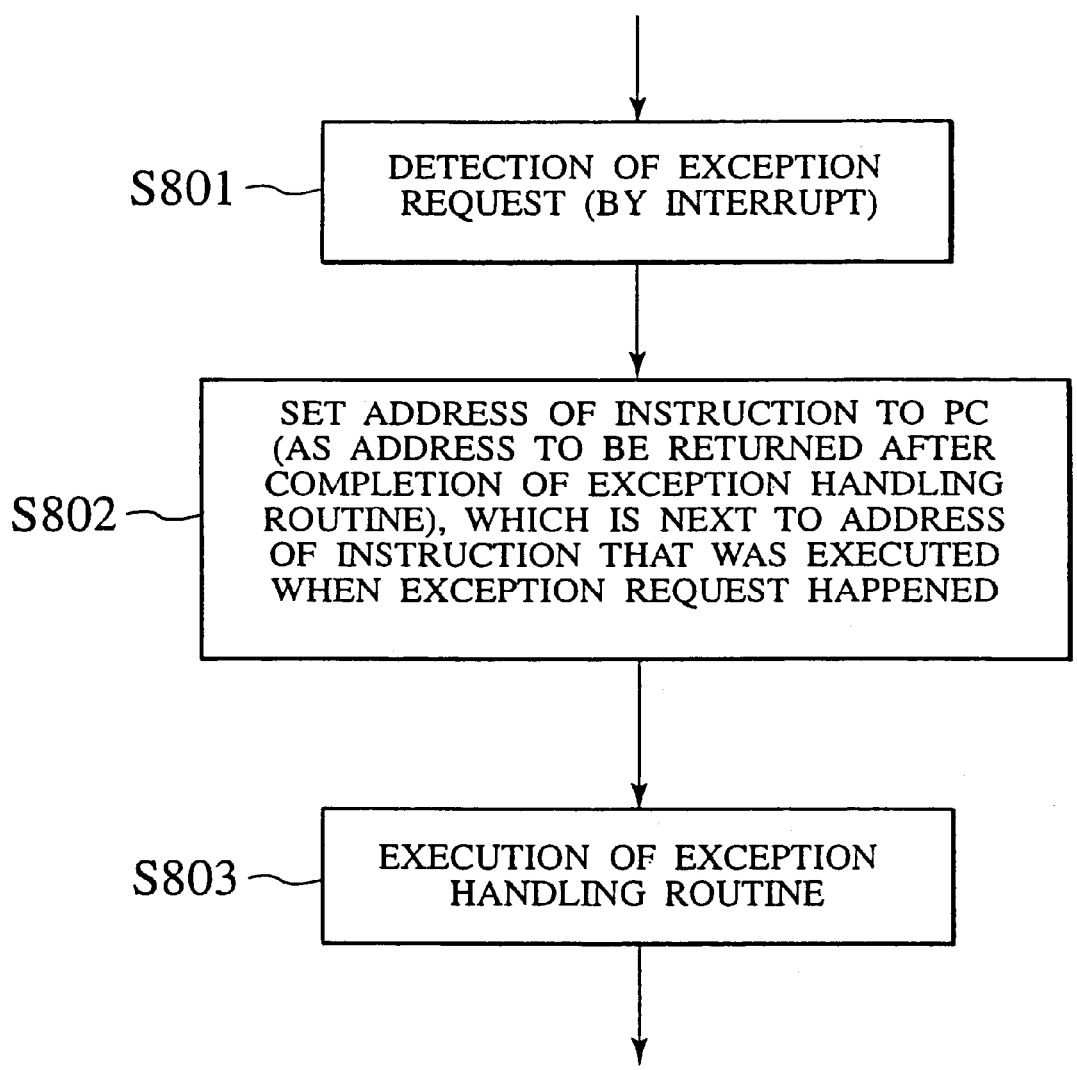
FIG. 8 is a flow chart showing the operation of a processor core in the conventional microprocessor shown in FIG. 7 when an exception handling happens.
Figure 9A:
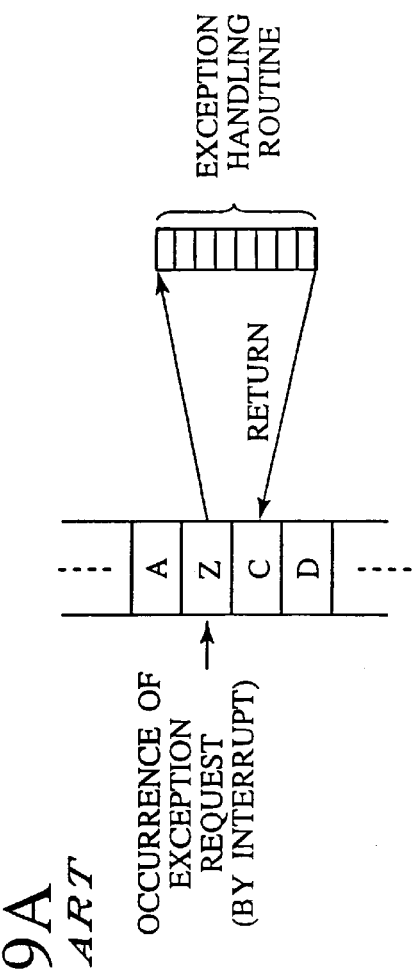
FIGS. 9A and 9B are diagrams showing an instruction sequence and an operation procedure to be executed by the processor core in the conventional microprocessor shown in FIG. 7 when the exception handling happens shown in the flow chart of FIG. 8.
Figure 9B:
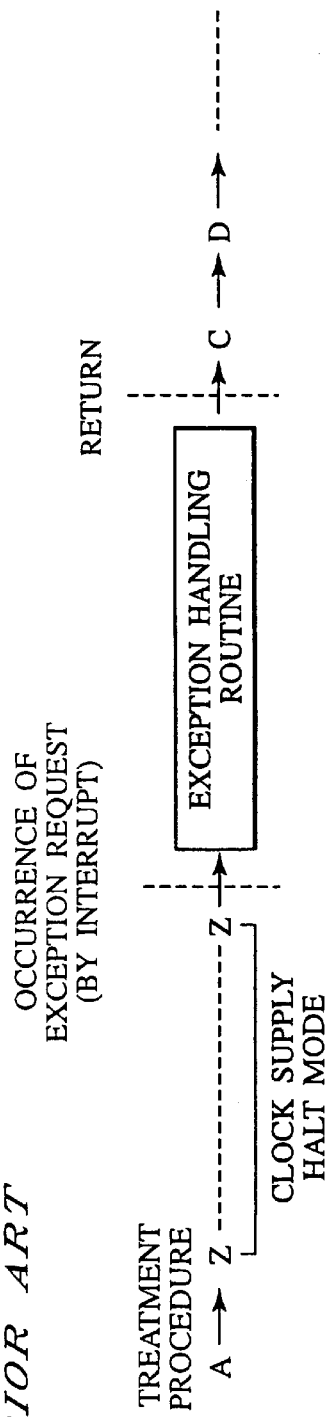

FIG. 6 is a flow chart showing the operation of the processor core 11 in the microprocessor shown in FIG. 5 when the exception handling happens. For the following explanation of the second embodiment, both FIGS. 2A, 2B, and 2C and FIGS. 3A, 3B, and 3C will be used.

At first, the processor core 11 in the microprocessor according to the second embodiment shown in FIG. 5 is executing the instruction B after the instruction A in the instruction sequence, for example, as shown in FIG. 2(a), and an exception request happens when the processor core 11 is executing the instruction B that is a normal instruction other than the standby mode caused by the clock supply halt instruction Z as the clock supply halt mode.

That is, in the situation where the processor core 11 executes firstly the instruction A and then instruction B, the exception request happens during the execution of the instruction B, and the flip-flop 13 stores the value "1", and the clock CLK is supplied to the processor core 11 through the AND circuit 17. When detecting the occurrence of the exception request, the exception request detection section 16 informs the detection result to both the clock supply halt control section 12 and the processor core 11.

When receiving the information regarding the occurrence of the exception request, the clock supply halt control section 12 copies the value "1" stored in the flip-flop 13 to the flip-flop 14, and controls the flip-flop 13 so that the flip-flop 13 keeps the value "1". In parallel to this process, the processor core 11 or another control circuit (not shown) sets to the PC an address of the following instruction C as the target address to be returned after the completion of an exception handling routine caused by the exception request (Step S602). The instruction C is next in address to the instruction B which was executed when the exception request happened.

At Step S603 in the flowchart shown in FIG. 6, the processor core 11 checks the value stored in the flip-flop 14. When the value stored in the flip-flop 14 is not the value "0" (namely, the value "1"), the operation flow goes to Step S605 in order to execute the exception handling routine. When checking the value stored in the flip-flop 14 at Step S603, the processor core 11 resets the flip-flop 14, namely the value of the flip-flop 14 is not changed because the processor core 11 sets the value "1" to the flip-flop 14. The processor core 11 returns to the execution of the instruction C after the completion of the exception handling routine at Step S605, and then executes the instruction C which has been set to the PC at Step S602 (namely, which is next in address to the instruction B that was executed when the exception request happened).

Because the flip-flop 14 stores the value "1" in the case where the processor core 11 executes an instruction other than the clock supply halt instruction Z when the exception request detection section 16 detects the exception request, the instruction to be executed by the processor core 11 immediately following the completion of the exception handling routine becomes the instruction C, as shown in FIG. 2A and FIG. 3A.

Next, a description will be given of the case in which the processor core 11 is executing the clock supply halt instruction Z as the standby process that means the clock supply halt mode when the exception request happens.

As shown in FIG. 2B and FIG. 3B, the processor core 11 firstly executes the instruction A and then clock supply halt instruction Z. Thereby, the processor core 11 gives the instruction to the clock supply halt control section1 12 in order to halt the supply of the clock CLK. When receiving the instruction from the processor core 11, the clock supply halt control section1 12 sets the value "0" to the flip-flop 13 and the flip-flop 14. When the flip-flop 13 stores the value "0", one input of the AND circuit 17 is the value "0" so that the AND circuit 17 outputs the fixed data of a low level "1" continuously. Accordingly, the supply of the clock CLK to the processor core 11 is halted. That is, the processor core 11 enters the standby mode.

In this situation, when detecting the occurrence of the exception request (Step S601), the exception request detection section 16 informs the occurrence of the exception request to the clock supply halt control section 12. The clock supply halt control section 12 sets the value "1" to the flip-flop 13 and the flip-flop 14 keeps the value "0". Thereby, the supply of the clock CLK to the processor core 11 is restarted because the value "1" is supplied to the AND circuit 17.

The processor core 11 or another control circuit (not shown) then sets to the PC the address of the following instruction C as the address to be returned after the completion of an exception handling routine caused by the exception request (Step S602). The instruction C is next in address to the clock supply halt instruction Z which was executed when the exception request happened.

Next, the processor core 11 checks the value of the flip-flop 14 at Step S603 and the operation flow goes to Step S405 only when the flip-flop 14 stores the value "0". When the flip-flop 14 stores the value "0", the operation flow goes to Step S604. At Step S604, the processor core 11 or another control circuit subtracts the value of the PC, which indicates the target address to be returned, by one. Then, the operation flow goes to Step S605. By the way, the processor core 11 resets the flip-flop 14 after it checks the value thereof. Accordingly, the flip-flop 14 thereby stores the value "1".

Because the value "1" is set to the flip-flop 13, the supply of the clock CLK to the processor core 11 is restarted through the AND circuit 17. The processor core 11 thereby executes the exception handling routine (Step S605).

The processor core 11 returns from the exception handling routine executed at Step S605 after the exception handling routine is completed and initiates to execute the clock supply halt instruction Z again designated by the PC, as shown in FIG. 2B and FIG. 3B. The processor core 11 indicates to the clock supply halt control section 12 in order to halt the supply of the clock CLK. Thereby, the clock supply halt control section 12 sets the value "0" to the flip-flop 13, so that the AND circuit 17 outputs the fixed value "0" continuously. This means that the supply of the clock CLK to the processor core 11 is halted. The processor core thereby enters the standby state.

Thus, in the case where the processor core 11 was executing the clock supply halt instruction Z when the exception request detection section 16 detected the occurrence of the exception request, it is possible to set the instruction Z shown in FIG. 2B and FIG. 3B to be executed by the processor core 11 immediately following the completion of the exception handling because the flip-flop 14 keeps the value "0" by the control of the clock supply halt control section 12.

By the way, in order to execute the instruction C whose address is next to the address of the instruction of the clock supply halt instruction Z after the completion of the exception handling routine in the case where the exception request detection section 16 detects the occurrence of the exception request while the processor core 11 is executing the clock supply halt instruction Z, the processor core 11 performs the following process:

That is, like the manner of the first embodiment, when detecting the occurrence of the exception request, the exception request detection section 16 controls the clock supply halt control section 12 according to the kind of the exception request so that the value "0" of the flip-flop 13 is not copied to the flip-flop 14 and the value "1" is set to the flip-flop 14. Thereby, the operation flows goes from Step S603 to Step S605 because it is detected at Step S603 that the flip-flop 14 stores the value "1".

Thus, in the microprocessor of the second embodiment, it is also possible to set the instruction to be executed by the processor core 11 after the completion of the exception handling routine at Step S605 is the instruction C as shown in FIG. 2C and FIG. 3C, like the first embodiment.

Furthermore, also like the first embodiment, in the example to execute the process shown in FIG. 2C and FIG. 3C, the exception request detection section 16 generates and transfers the instruction to the clock supply halt control section 12 according to the kind of the exception request supplied to the exception request detection section 16 so that the value "1" is set to the flip-flop 14. However, the present invention is not limited by this, for example, it is also possible that several kinds of clock supply halt instructions are prepared, and a desired kind of the clock supply halt instruction is inserted in the instruction sequence to be executed by the processor core 11, and the processor core 11 forcedly sets the flip-flop 14 according to the desired kind of the clock supply halt instruction. It is thereby possible to set the instruction C shown in both FIG. 2C and FIG. 3C as the instruction to be executed by the return of the processor core 11 immediately following the completion of the exception handling routine in the case where the exception request happens while the clock supply halt instruction is executed.

As described above, according to the microprocessor of the second embodiment, like the microprocessor of the first embodiment, it is possible to return to a desired operation mode after the completion of the exception handling routine by checking the value of the flip-flop 14 as the state of the processor core 11 when the exception request happened, namely, whether or not the clock supply halt instruction Z was executed when the exception request happened. Accordingly, it is possible to increase the flexibility of the microprocessor while reducing the power consumption.

As set forth in detail according to the microprocessor of the present invention, it is possible to return to a desired operation mode after the completion of the exception handling routine by checking whether or not the clock supply halt instruction Z was executed when the exception request happened. Accordingly, it is also possible to increase the flexibility of the microprocessor.

While the above provides a full and complete disclosure of the preferred embodiments of the present invention, various modifications, alternate constructions and equivalents may be employed without departing from the scope of the invention. Therefore the above description and illustration should not be construed as limiting the scope of the invention, which is defined by the appended claims.

What is claimed is:

1. A microprocessor capable of handling a function for setting a processor core into a standby state caused by executing a clock supply halt instruction in which a supply of a clock to the processor core for executing various kinds of processes and instructions is temporarily halted, the microprocessor comprising:

a memory circuit for storing a state of the processor core at an occurrence time of an exception request caused by an interrupt, wherein, the processor core selects and executes the instruction to be executed according to the value stored in the memory circuit when the state of the processor core returns from an exception handling after a completion of the exception handling caused by the exception request.

2. A microprocessor according to claim 1, wherein the memory circuit stores the value to be used for judging whether the processor core is in the standby state in which no clock is supplied or in a normal state other than the standby state when the exception request happens.

3. A microprocessor according to claim 2, wherein the value stored in the memory circuit indicates that the processor core is in the standby state where no clock is supplied when the exception handling happens, the processor core selects the clock supply halt instruction to be executed when the state of the processor core returns from the exception handling after the completion of the exception handling.

4. A microprocessor according to claim 2, wherein the value stored in the memory circuit indicates that the processor core is in the standby state where no clock is supplied when the exception handling happens, the processor core selects an instruction, whose address is next to the address of the clock supply halt instruction, to be executed when the state of the processor core returns from the exception handling after the completion of the exception handling.

5. A microprocessor according to claim 2, wherein the value stored in the memory circuit indicates that the processor core is in the normal state other than the standby state where no clock is supplied when the exception handling happens, the processor core selects an instruction, whose address is next to the address of the clock supply halt instruction, to be executed when the state of the processor core returns from the exception handling after the completion of the exception handling.

6. A microprocessor according to claim 2, wherein the memory circuit is a flip-flop for storing a value indicating whether the clock is supplied to the processor core or not, and wherein the processor core checks the value stored in the flip-flop until the exception handling is completed in order to judge whether the state of the processor core when the exception handling happens is in the standby state where no clock is supplied or in a normal state other than the standby state.

7. A microprocessor according to claim 3, wherein the memory circuit is a flip-flop for storing a value indicating whether the clock is supplied to the processor core or not, and wherein the processor core checks the value stored in the flip-flop until the exception handling is completed in order to judge whether the state of the processor core when the exception handling happens is in the standby state where no clock is supplied or in a normal state other than the standby state.

8. A microprocessor according to claim 4, wherein the memory circuit is a flip-flop for storing a value indicating whether the clock is supplied to the processor core or not, and wherein the processor core checks the value stored in the flip-flop until the exception handling is completed in order to judge whether the state of the processor core when the exception handling happens is in the standby state where no clock is supplied or in a normal state other than the standby state.

9. A microprocessor according to claim 5, wherein the memory circuit is a flip-flop for storing a value indicating whether the clock is supplied to the processor core or not, and wherein the processor core checks the value stored in the flip-flop until the exception handling is completed in order to judge whether the state of the processor core when the exception handling happens is in the standby state where no clock is supplied or in a normal state other than the standby state.

10. A microprocessor according to claim 1, wherein the processor core changes the instruction to be executed when the state of the processor core returns from the exception handling after the completion of the exception handling.

11. A microprocessor capable of handling a function for setting a processor core into a standby state caused by executing a clock supply halt instruction in which a supply of a clock to the processor core for executing various kinds of processes and instructions is temporarily halted, the microprocessor comprising:

a logical circuit for performing a supply/halt of the clock to the processor core;

a first memory circuit for storing a set value to be used for controlling the supply of the clock to the processor core through the logical circuit;

a second memory circuit for storing the set value of the first memory circuit; and a judgment control section for setting the set value of the first memory circuit to the second memory circuit at an occurrence time of the exception request when the judgment control section detects the occurrence of an exception request, in order to supply the clock through the logical circuit to the processor core, and for indicating that the processor core executes the exception handling, where in the processor core sets the instruction to be executed according to the set value of the second memory circuit when the processor core returns from the exception handling after the completion of the exception handling.

12. A microprocessor according to claim 11, wherein the judgment control section comprises:

an exception request detection section; and a clock supply halt control section, wherein the exception request detection section detects an occurrence of the exception request and outputs a detection result to both the clock supply halt control section and the processor core, the clock supply halt control section sets the set value of the first memory circuit to the second memory circuit according to the detection result from the exception request detection section, and the processor core executes the exception handling based on the detection result from the exception request detection circuit, and controls the setting operation to the first memory circuit by the clock supply halt control section based on the set value of the second memory circuit after the completion of the exception handling, and selects and executes the instruction to be executed after the completion of the exception handling.

13. A microprocessor according to claim 11, wherein each of the first memory circuit and the second memory circuit is a flip-flop.

14. A microprocessor according to claim 12, wherein each of the first memory circuit and the second memory circuit is a flip-flop.

15. A microprocessor according to claim 11, wherein the logical circuit is an OR gate which inputs the clock as one input and inputs the set value of the first memory circuit as another input.

16. A microprocessor according to claim 12, wherein the logical circuit is an AND gate which inputs the clock as one input and inputs the set value of the first memory circuit as another input.

17. A microprocessor according to claim 13, wherein the logical circuit is an OR gate which inputs the clock as one input and inputs the set value of the first memory circuit as another input.

18. A microprocessor according to claim 14, wherein the logical circuit is an AND gate which inputs the clock as one input and inputs the set value of the first memory circuit as another input.

* * * * *

UNITED STATES PATENT AND TRADEMARK OFFICE
CERTIFICATE OF CORRECTION

PATENT NO. : 6,757,810 B1
DATED : June 29, 2004
INVENTOR(S) : Takahashi

It is certified that error appears in the above-identified patent and that said Letters Patent is hereby corrected as shown below:

<u>Title page, Item [54] and Column 1, lines 1-5,</u>
Title, should read: -- MICROPROCESSOR INCLUDING MEMORY FOR STORING SET VALUE USED TO SELECT AND EXECUTE INSTRUCTION AFTER COMPLETING EXCEPTION HANDLING CAUSED BY EXCEPTION REQUEST --

Signed and Sealed this

Seventh Day of September, 2004

JON W. DUDAS
*Director of the United States Patent and Trademark Office*